United States Patent Office 3,391,234
Patented July 2, 1968

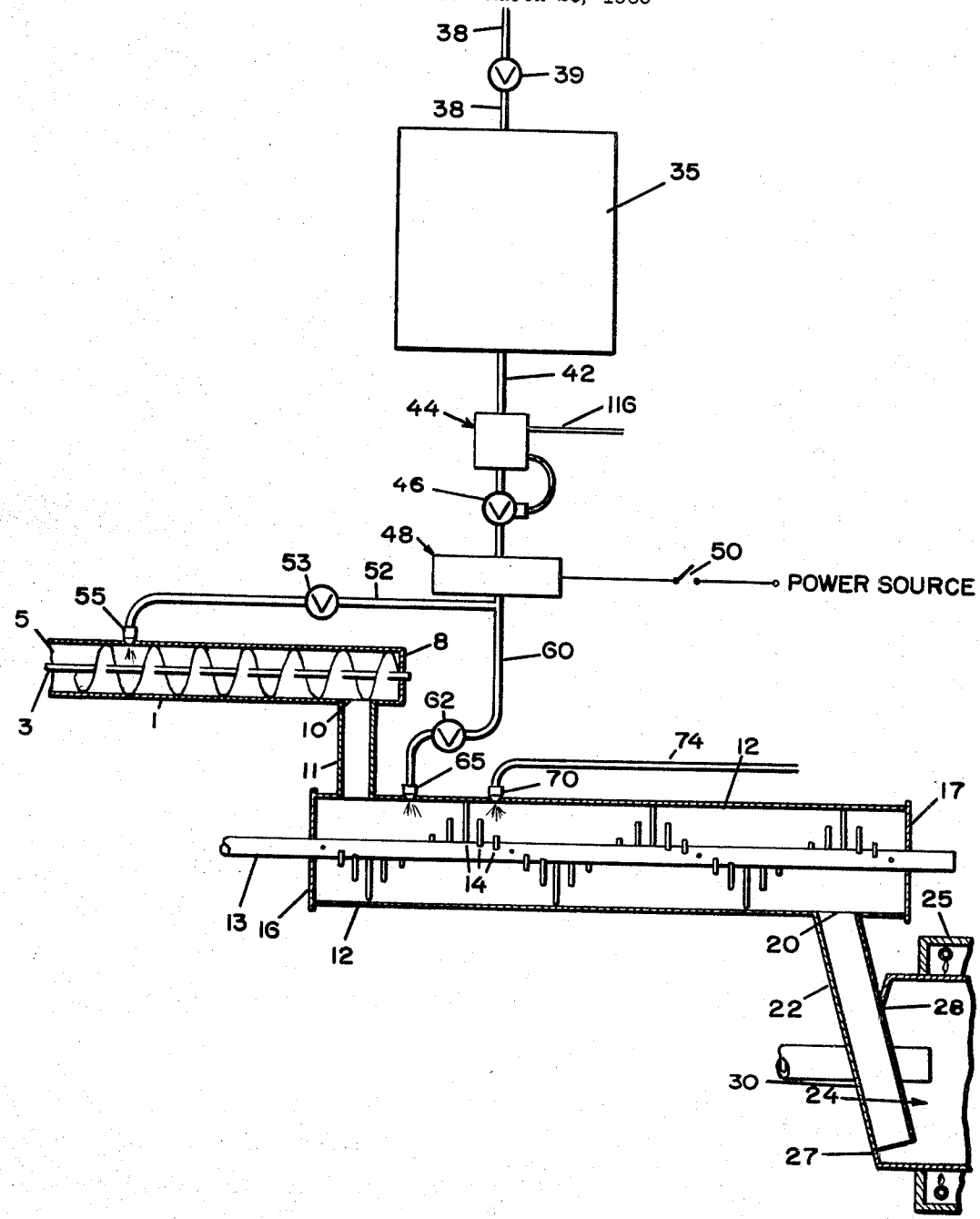

3,391,234
METHOD AND APPARATUS FOR PELLETIZING CARBON BLACK
Carl M. Walenciak, Eunice, and William E. Penn, Hobbs, N. Mex., assignors to Continental Carbon Company, Houston, Tex., a corporation of Delaware
Filed Mar. 26, 1965, Ser. No. 443,156
4 Claims. (Cl. 264—117)

ABSTRACT OF THE DISCLOSURE

Method including apparatus for making improved carbon black pellets which comprises wetting the loose carbon black with suitable droplets of hydrocarbon pelletizing aid prior to contacting with the water pelletizing medium, agitating the black and hydrocarbon to form a mixture, contacting the mixture of black with water, processing in a wet pelletizing operation.

---

This invention relates to the manufacture of carbon black, and particularly carbon black which is produced in pelletized form.

At the present time only a small portion of manufactured carbon black is marketed as dense fluffy material, the vast majority being in pelletized form, principally because it is of higher density, much cleaner and less dusty to handle, and can more easily be handled to and from bulk storage and transportation equipment.

Of the two widely used carbon black pelletizing practices the older process involves the agitation of dry loose carbon black in the presence of seed pellets for relatively long periods of time until a dry pelletized product is formed; and The newer process wherein loose carbon black is mixed 30% to 50% water and then agitated for relatively short periods of time to form wet pellets, the agitation usually being accomplished in a continuous flow pattern by a pin-shaft type agitator rotating within a cylindrical chamber. The cylindrical chamber is stationary, of relative small volume, and more or less horizontally disposed. Loose carbon black and water are separately fed to the inlet end of the cylindrical chamber or pelletizing box, and the wet pellets are continuously discharged from the discharge end (normally by gravity) into a rotating, drying drum.

Of the two described processes, probably more than 75% of carbon black is now being pelletized by the newer wet process. The reason for this is that the product of the wet process is a more uniform, durable pellet that is less dusty and that ships and unloads more easily from bulk storage and shipping equipment. But despite the fact that the present wet pelletizing process is a great improvement over the old dry pelletizing method, it is far from perfect. When the wet pelletizing process is used to pelletize tread grade black such as HAF, ISAF and SAF, there usually results a fairly uniform spherical pellet varying mainly between $\frac{1}{32}''$ to $\frac{1}{16}''$. When this process is used on carcass grade blacks, especially GPF and SRF, a very much more irregular pellet usually results. These pellets are normally larger, more irregular in shape, have a much wider pellet size range, and are higher in overs and fines. The larger pellets and chunks are usually hard and do not disperse well in soft rubber mixes such as oil, extended rubber and butyl rubber.

One of the greatest needs in the carbon black processing today is for an improved pelletizing process that will give a small uniform size spherical pellet on all grades of carbon black. For the present needs of the rubber industry, a pelleted carbon black of ideal size would be one where 100% of the pellets would pass through a standard 10 mesh screen and be caught on a standard 35 mesh screen.

It is among the objects of the present invention to provide a method and apparatus for making wet pelletized carbon black in such manner as to:

(1) Reduce the average pellet diameter;
(2) Narrow the pellet size distribution;
(3) Produce pellets which are more spherical than heretofore;
(4) Reduce the volume of fines and overs.

Another object is the attainment of the foregoing results in a substantially economical fashion.

More specifically, the present invention contemplates uniformly mixing very small hydrocarbon liquid droplets with the loose carbon black and then adding the pelletizing water, whereby seed pellets are formed.

For further understanding of the invention, and additional objects and advantages thereof, reference will be had to the following description and accompanying drawings, and to the appended claims in which the various novel features are more particularly set forth:

In said drawings:

The single figure is a schematic diagram of an apparatus lay-out which may be successfully employed to practice the teachings of the present invention.

Referring more particularly to the drawing, the numeral 1 designates a cylindrical housing through which there extends an axially disposed and suitably journaled rotatable shaft 3 carrying a feed screw 5.

One end of the cylindrical housing 1 is open to afford communication with a source of supply of loose carbon black; while the other end thereof is closed as shown at 8.

Adjacent its closed end 8, the bottom of the cylindrical housing 1 is provided with a discharge opening 10 which communicates with the upper end of a gravity down leg 11.

Disposed below the closed end 8 of the cylindrical housing 1 is a cylindrical pelletizing-mixing box 12. This pelletizing-mixing box 12 may for present purposes be entirely conventional and comprise an axially extending rotatable shaft 13 with radially extending agitator pins 14.

Both ends of the cylindrical or pelletizing-mixing box 12 are closed, as shown at 16 and 17.

Adjacent its closed end 17 the pelletizing-mixing box 12 is provided, on its lower surface or underside, with an opening 20 which communicates with the upper end of a gravity chute 22.

A conventional rotatable drying drum 24 is disposed adjacent the lower end of the gravity chute 22, the same being provided with the circumferentially disposed heating means 25.

That end of the rotatable drying drum 24 which is most adjacent the closed end 17 of the cylindrical pelletizing-mixing box 12 is provided with a closure or head 27 having an opening 28 for receiving the lower end of the gravity chute 22 and an opening 30 for receiving the conduit for exhausting the drying drum gases.

Disposed above the elements of the apparatus described hereinbefore is a storage tank 35 for the hydrocarbon to be admixed with the carbon black.

This hydrocarbon storage tank 35 is effectively sealed and the top thereof communicates with a compressed air line 38 containing a valve 39.

Communicating with the bottom of the hydrocarbon storage tank 35 is a hydrocarbon supply line 42 which contains a flow controller 44 and metering needle valve 46 which is manually operated via line 116. According to this arrangement the rate of flow of the hydrocarbon pelletizing aid may be automatically proportioned to the flow of carbon black or simply through the manually operated metering needle valve; alternatively, a metering pump system may be employed.

Also included in the hydrocarbon supply line 42 is a vaporizer 48 which is connected with a suitable power source for heating through a switch 50.

The outlet of the cold vaporizer 48 communicates with a hydrocarbon supply line 52 containing a valve 53. This hydrocarbon supply line 52 is connected to a hydrocarbon spray orifice 55 which is disposed adjacent the inlet end of the cylindrical housing 1.

Also connected to the outlet of the vaporizer 48 is a hydrocarbon supply line 60 which communicates, through a valve 62, with a hydrocarbon spray orifice 65 which is disposed adjacent the inlet end of the pelletizing-mixing box 12.

Disposed rearwardly of the hydrocarbon spray orifice 65 in the pelletizing-mixing box 12 is a water spray orifice 70 which communicates with a suitable source of pelletizing water through a water supply line 74.

The hydrocarbon pelletizing aid is passed through the vaporizer 48 from its source, the liquid or vaporized hydrocarbon moving through line 52 and valve 53 to the hydrocarbon inlet port 55 at the forward end of the cylindrical housing 1 for the screw conveyor. At such time valve 62 in line 60 will be closed. On the other hand, the hydrocarbon pelletizing aid can be fed directly to the pelletizing-mixing box 12 through alternate line 60 by opening valve 62 and closing the valve 53. In either case, the hydrocarbon is uniformly mixed with the fluffy carbon black before the pelletizing water addition.

If vaporized hydrocarbon is used, no atomizing sprays are necessary and the vaporizer should be located as close to the point of hydrocarbon addition to the carbon black as possible, to thereby prevent condensation in the feed line.

If liquid hydrocarbon is used, a spray nozzle is used at the hydrocarbon spray orifices 55 and 65.

The amount of hydrocarbon added should be between 0.05 to 0.5 gallon per 1,000 pounds of loose carbon black; and preferably between 0.1 to 0.3 gallon per 1,000 pounds of carbon black.

Although hydrocarbons of high molecular weight can be used, hydrocarbons or mixtures of hydrocarbons that completely vaporize below 200° C. are preferable so that partial or complete vaporization will occur in the drying drum. It is also desirable that these hydrocarbons be water white or very light in color so as not to increase the staining properties of the resulting carbon black pellets in case complete vaporization does not occur during the drying operation.

Some typical hydrocarbon additives that we have successfully used as pelletizing aids are: kerosene, gasoline, light gas oil, light lubricating oil, benzene and toluene.

We have also successfully used some halogenated hydrogenated hydrocarbons additives, including: chloroform, carbon tetrachloride, 1,1,1 trichloroethane (methyl chloroform).

A modification of the invention contemplates the introduction of the hydrocarbon to the loose or particulate carbon black in advance of the wet pelletizing equipment. This would include any point in the carbon black conveying system used to transport the loose carbon black from the carbon black collecting equipment to the wet pelletizing equipment.

The hydrocarbon may be utilized in the form of a hydrocarbon-water emulsion.

Although almost any method can be used to inject the hydrocarbon into the fluffy carbon black, it has been found that superior results are obtained if atomizing spray nozzles are used, or if the hydrocarbon is injected into the loose carbon black stream in vaporized form.

Immediately following are two examples of results which have been obtained by practicing the method of the present invention:

EXAMPLE I

| GPF Light Treated Pellets | Without Naphtha | With Naphtha |
|---|---|---|
| Time (a.m.) | 9:22 | 10:42 |
| Percent Naphtha in Carbon Black | 0 | 0.103 |
| Carbon Black Thruput, lbs./min | 69.4 | 64.8 |
| Percent H₂O Wet Pellets | 41.2 | 44.6 |
| Screen Analysis: | | |
| 10 Mesh (M) | 17.1 | 2.6 |
| 12 Mesh | 20.8 | 2.9 |
| 18 Mesh | 50.4 | 34.9 |
| 35 Mesh | 10.7 | 57.3 |
| 60 Mesh | 0.9 | 2.2 |
| 120 Mesh | 0.1 | 0.1 |
| Pan | 0.0 | 0.0 |
| Percent Coarser than 12 Mesh | 37.9 | 5.5 |
| Percent From 12 M to 35 Mesh | 61.1 | 92.2 |

EXAMPLE II

| SRF Furnace Black | Without Additive | With Additive |
|---|---|---|
| Hydrocarbon Used | None | |
| Gals./1,000 lbs. of Carbon Black | 0 | .1 |
| Screen Analysis Percent On: | | |
| 10 Mesh | 16.9 | 1.05 |
| 12 Mesh | | .08 |
| 18 Mesh | 43.8 | 4.17 |
| 35 Mesh | 31.8 | 87.70 |
| 60 Mesh | | 7.00 |
| 120 Mesh | | .04 |
| Pan | 6.9 | |

The foregoing examples effectively demonstrate, through comparisons of screen sizes, the superior results which are obtainable by uniformly mixing very small hydrocarbon liquid droplets with loose carbon black prior to the addition of the pelletizing water.

While we have shown and described certain specific embodiments of the present invention, it will be readily understood by those skilled in the art that we do not wish to be limited exactly thereto, since various modifications may be made without departing from the scope of the invention as defined in the appended claims.

We claim:

1. The method of pelletizing carbon black which includes moving loose carbon black through a chamber while imparting agitational movement thereto; moistening said loose carbon black with a hydrocarbon in the form of small droplets on said black in amount from about 0.05 to about 0.5 gallon per 1,000 pounds of said black while in said chamber; transferring said moistened and agitated carbon black to a wet pelletizing-mixing box; moistening said loose carbon black with water while in said wet pelletizing-mixing box; and removing the wet pellets from said wet pelletizing-mixing box preparatory to drying the same.

2. The method of claim 1 wherein the added hydrocarbon is between 0.1 to 0.3 gallon per 1,000 pounds of carbon black.

3. Apparatus for making wet-pelletized carbon black comprising, in combination, means for conveying and agitating loose carbon black; a pelletizing-mixing box having its inlet end communicating with the outlet end of said conveying and agitating means; means for supplying water to said pelletizing-mixing box adjacent to but spaced from its inlet end; pellet drying means communicating with the outlet end of said pelletizing-mixing box; means for supplying liquid hydrocarbon under pressure; flow control means communicating with said last-named means; hydrocarbon spray means in said conveying and agitating mean; and hydrocarbon spray means between said water supplying means and the inlet end of said pelletizing-mixing box; both of said hydrocarbon spray means communicating with said flow control means.

4. Apparatus for making wet-pelletized carbon black comprising, in combination, means for conveying and agitating loose carbon black; a pelletizing-mixing box having its inlet end communicating with the outlet end of said conveying and agitating means; means for supplying water to said pelletizing-mixing box adjacent to but spaced from its inlet end; pellet drying means communicating with the outlet end of said pelletizing-mixing box; means for supplying liquid hydrocarbon under pressure; flow control means communicating with said last-named means; a vaporizer communicating with said flow control means; hydrocarbon spray means in said conveying and agitating means; hydrocarbon spray means between said water supplying means and the inlet end of said pelletizing-mixing box; both of said hydrocarbon spray means communicating with said vaporizer.

References Cited

UNITED STATES PATENTS

| | | | |
|---|---|---|---|
| 2,131,686 | 9/1938 | Heller et al. | 23—314 |
| 2,848,347 | 8/1958 | Rushford | 106—307 |
| 3,005,725 | 10/1961 | Daniell | 106—307 |
| 3,011,902 | 12/1961 | Jordan | 106—307 |
| 3,333,038 | 7/1967 | Walenciak | 264—117 |
| 3,338,729 | 8/1967 | Ruoho | 106—307 |
| 3,340,080 | 9/1967 | Henderson | 106—307 |

EDWARD J. MEROS, *Primary Examiner.*